United States Patent [19]
Vidovic

[11] Patent Number: 5,809,248
[45] Date of Patent: Sep. 15, 1998

[54] METHOD AND APPARATUS FOR FRONT END NAVIGATOR AND NETWORK ARCHITECTURE FOR PERFORMING FUNCTIONS ON DISTRIBUTED FILES IN A COMPUTER NETWORK

[75] Inventor: Nino Vidovic, Sunnyvale, Calif.

[73] Assignee: Sun Microsystems, Inc., Palo Alto, Calif.

[21] Appl. No.: 498,182

[22] Filed: Jul. 5, 1995

[51] Int. Cl.[6] .............................. G06F 15/163; G06F 9/46; G06F 17/30

[52] U.S. Cl. ............... 395/200.49; 395/704; 395/183.14; 345/335; 707/501

[58] Field of Search ......................... 395/200.09, 200.03, 395/200.12, 200.11, 704, 183.14, 326, 335, 793, 762, 200.47, 200.48, 200.49, 200.57, 200.59, 200.54, 200.55; 345/326, 335; 707/501, 531

[56] References Cited

U.S. PATENT DOCUMENTS

| | | |
|---|---|---|
| 4,589,068 | 5/1986 | Heinen . |
| 5,355,472 | 10/1994 | Lewis ........................................ 395/793 |
| 5,371,746 | 12/1994 | Yamashita et al. ................. 395/183.14 |
| 5,410,648 | 4/1995 | Pazel ........................................ 395/704 |
| 5,544,320 | 8/1996 | Konrad ............................... 395/200.09 |
| 5,579,469 | 11/1996 | Pike ......................................... 395/326 |

FOREIGN PATENT DOCUMENTS

5225090  9/1993  Japan .

OTHER PUBLICATIONS

Hahn, M.;"Uniform Resource Locators"; EDPACS vol. 23, No. 6, pp. 8–13, Dec. 1995.

Luotonen, A,; "CERN httpd 3.0 Guide for Prereleases"; retrieved from Internet at http://www.iclnet.org.Guide.html, May 1994.

Bush, N. C.; "Implementing NCSA httpd"; retrived from Internet at http://www.oac.uci.edu/X/W6/httpd-howto.html/#Steps, Jan. 31, 1995.

Jurvis, J.; "Taligent keeps its promises"; InformationWeek n550 p93(6), Oct. 23, 1995.

Karamcheti, V. et al.; "Concert—Efficient Runtime Support for Concurrent Object0Oriented Programming Languages on Stock Hardware"; Proceedings of Supercomputing '93, Portland, Oregon, Nov. 19, 1993.

Peters, et al.; "Crystalweb —A Distributed Authoring Enviroment For the World-Wide Web"; Computer Networks and ISDN Systems, vol. 27, No. 6, pp. 861–870, Apr. 1, 1995.

J. Paoli; "Cooperative Work In the Network: Edit The WWW"; Computer Networks and ISDN Systems, vol. 27, No. 6, pp. 841–847, Apr. 1, 1995.

B. Rousseau; "Publishing On The Web"; Cern School of Computing; pp. 279–293; Oct. 25, 1995.

*Primary Examiner*—Mark H. Rinehart
*Attorney, Agent, or Firm*—Beyer & Weaver, LLP

[57] ABSTRACT

The present invention provides methods and apparatus for a front end navigating tool that may access and manipulate files distributed across different physical machines and platforms. The front end navigating tool communicates with a plurality of server processes, resident on networked servers, to perform all types of file manipulations such as such as debugging and editing. The server processes communicate with gateway processes resident on the same machine as the calling server process that perform the desired function on any of a plurality of program segments that may distributed across a plurality of computers. The present invention supports any type of function, such as debugging, browsing and editing, that may be applied to a file.

17 Claims, 7 Drawing Sheets

METHOD AND APPARATUS FOR FRONT END NAVIGATOR AND NETWORK ARCHITECTURE FOR PERFORMING FUNCTIONS ON DISTRIBUTED FILES IN A COMPUTER NETWORK

BACKGROUND OF THE INVENTION

1. Field of the Invention

The present invention relates to computer networks, and, more particularly, to methods and apparatus for providing a user interface to access and manipulate files distributed over a computer network.

2. Art Background

In response to societal demand, computer networks have been proliferating rapidly in recent years. Such networks include local area networks (LANS) and wide area networks (WANS) comprising a number of computers that may communicate with one another. Apart from sending messages, this communication between networked computers allows programs to be run on more than one computer in a network. For example, an airline reservation service may present a user interface on a client computer while data input to the interface is transmitted to a server computer where a reservation database is accessed. This type of program execution, known as distributed programming, may be much more complicated than the above example but is nonetheless extremely common and efficient.

Distributed programs, however, are often written, developed and tested on different computers with different tools which are tightly bound to the particular machine upon which they operate and are integrated around language, computing platform or type of application. Continuing the above example, the graphic user interface portion may be developed on the client computer with a set of program tools for the Visual C++ programming language for PC Windows and a different set of tools for a graphic user interface (GUI) builder. Similarly, the reservation database may be developed on the server with a set of program tools from the C++ Workshop programming language running under Unix. Further, a program initially developed with a tool set, frequently may be redeveloped under a later version of the same tool set and possibly from a different manufacturer.

Thus, distributed programs present substantial difficulties to programmers since they must learn to operate the tool set that was used to develop each distributed tool segment. These tool sets are usually quite detailed and require days, weeks and even months to master. Further, to edit, view or debug the distributed program currently requires performing these functions under one tool set for a particular program segment, exiting the tool set, locating the tool set for a different program segment, which may be on a different computer, and entering that tool set. This type of operation is extremely time consuming, especially where a program has a large number of segments, each developed with a different tool set.

By employing a particular protocol, the World Wide Web has met the challenge of allowing users, through a single front end tool, to browse documents that reside on a large number of different platforms. The World Wide Web, however, which has been in existence for a number of years, does not provide for any other types of functions apart from browsing and thus the previously described problems presented by distributed programs remain.

Thus, there is a need for a system that provides the capability to develop distributed programs that operate on different computers, operating systems and communication protocols, while requiring only one set of tools. Further, there is a need for a system that allows such integration for programs that have already been partially developed or completely developed under a variety of tool environments and that require modification. More broadly, there is a need for a system that allows a single front end tool to perform operations on a plurality of files that reside on different platforms without requiring a user to separately access each separate platform specific piece on that platform. The present invention answers these and many other needs.

SUMMARY OF THE INVENTION

The present invention provides methods and apparatus for a front end navigating tool (the "NAVIGATOR") that may access and manipulate files distributed across different platforms. The front end navigating tool communicates with a plurality of server processes, resident on networked servers, to perform all types of file manipulations such as debugging and editing. The server processes communicate with gateway processes resident on the same machine as the calling server process that perform the desired function on any of a plurality of program segments that may be distributed across a plurality of computers.

Debugging is one example of a function that may involve distributed files. To service a debugging request, the navigator issues a request according to the URL protocol. Thus, a request is of the form: server type://machine/request, where server type is a protocol such as, for example, http or process, machine is the actual server address and request is the program or file that is requested. The appropriate machine and server process is then contacted by the navigator and provided with the name of the file, file A. The server process in turn selects the appropriate gateway process to perform the desired function. The gateway process attaches to the desired program, which is subsequently debugged. If the program calls a program on a different machine, the present invention provides a variety of mechanisms, transparent to the user, for allowing debugging to continue on the called program. In a preferred embodiment, the gateway process provides the server process with the address of the called program, file B. The server process notifies the navigator which then automatically assembles a request to the server process on the different host. The request is sent and the server process selects the appropriate gateway process which then attaches to the target program, file B. If file B returns to file A, then control is again passed to the navigator which calls file A as before except that the gateway process has maintained the appropriate address of the instruction after the call instruction to file B. Debugging then continues on file A.

Browsing, editing and any other function requests are similarly serviced through the front end navigator. A URL link contacts an appropriate server process resident on a target machine and the server process in turn selects the proper gateway process, which performs the desired function on the target file. The target file may include hypertext links to other files and functions may easily be performed on these files by clicking on the file names and then indicating a desired function. In this manner, users may efficiently access and manipulate distributed files through a single front end tool.

BRIEF DESCRIPTION OF THE DRAWINGS

The objects features and advantages of the present invention will be apparent from the following detailed description of the preferred embodiment of the invention with references to the drawings in which:

As shown in FIG. 7, the GUI provides the full panoply of functions that may be performed on the file.

NOTATION AND NOMENCLATURE

Figure 1:
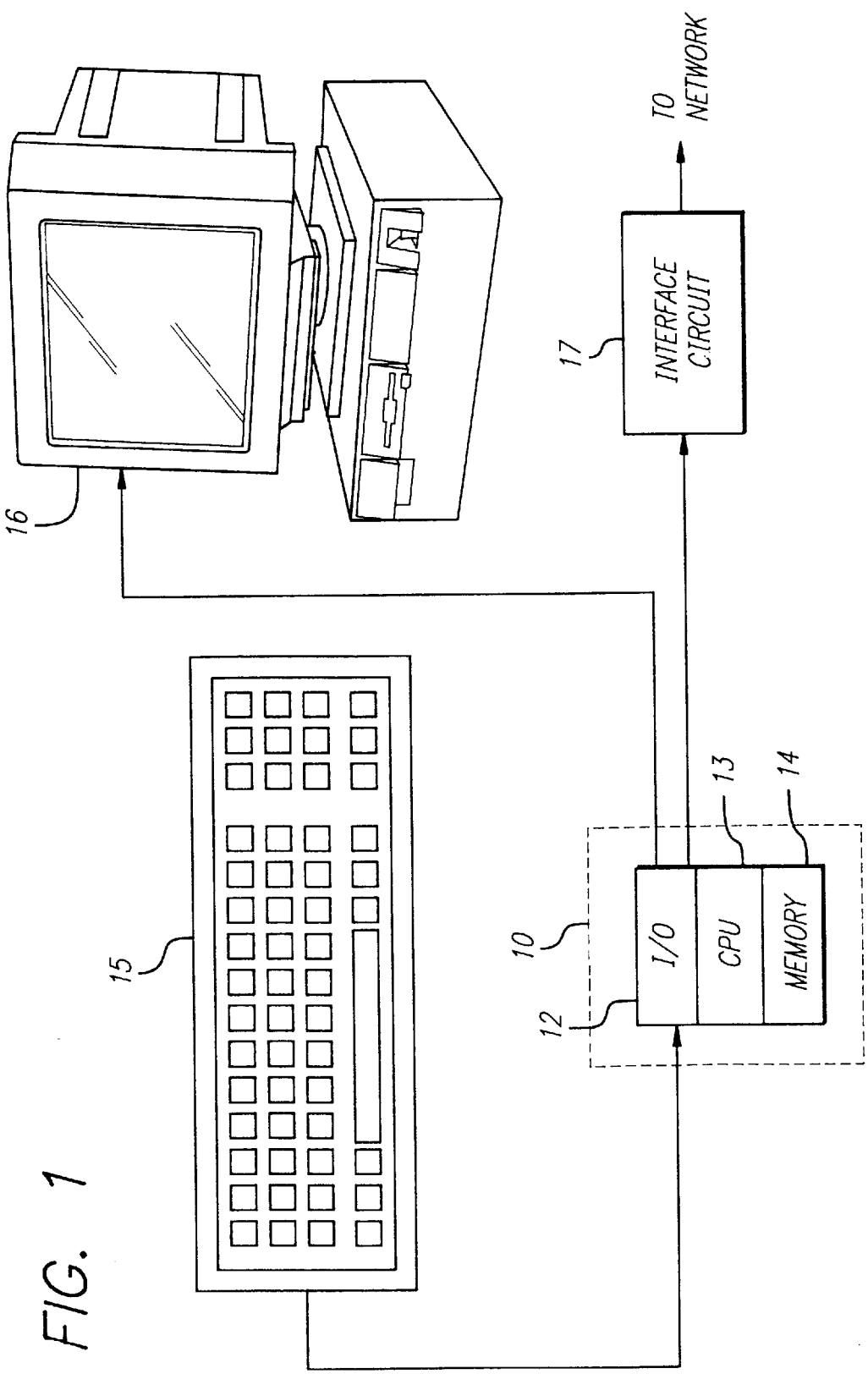
FIG. 1 is a functional block diagram illustrating one possible computer system incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below.

DETAILED DESCRIPTION OF THE INVENTION

The present invention discloses apparatus and methods for providing a user interface to access and manipulate files distributed over a computer network. In the following description, numerous specific details are set forth such as debugging and editing tools in order to provide a through understanding of the present invention. However, it will be apparent to one skilled in the art that the present invention may be practiced without these specific details. In other instances, well known circuits, structures and the like are not described in detail so as not to obscure the present invention unnecessarily.

Exemplary Hardware

FIG. 1 illustrates a data processing system in accordance with the teachings of the present invention. Shown is a computer 10, which comprises three major components. The first of these is an input/output (I/O) circuit 12 which is used to communicate information in appropriately structured form to and from other portions of the computer 10. In addition, computer 10 includes a central processing (CPU) 13 coupled to the I/O circuit 12 and a memory 14. These elements are those typically found in most general purpose computers and, in fact, computer 10 is intended to be representative of a broad category of data processing devices. Also shown is an interface circuit 17 coupled to the I/O circuit 12 for coupling the computer 10 to a network, in accordance with the teachings herein. The interface circuit 17 may include navigator circuitry incorporating the present invention, or as will be appreciated, the present invention may be implemented in software executed by computer 10. A raster display monitor 16 is shown coupled to the I/O circuit 12 and issued to display images generated by CPU 13 in accordance with the present invention. Any well known variety of cathode ray tube (CRT) or other type of display may be utilized as display 16.

System Architecture

Figure 2:
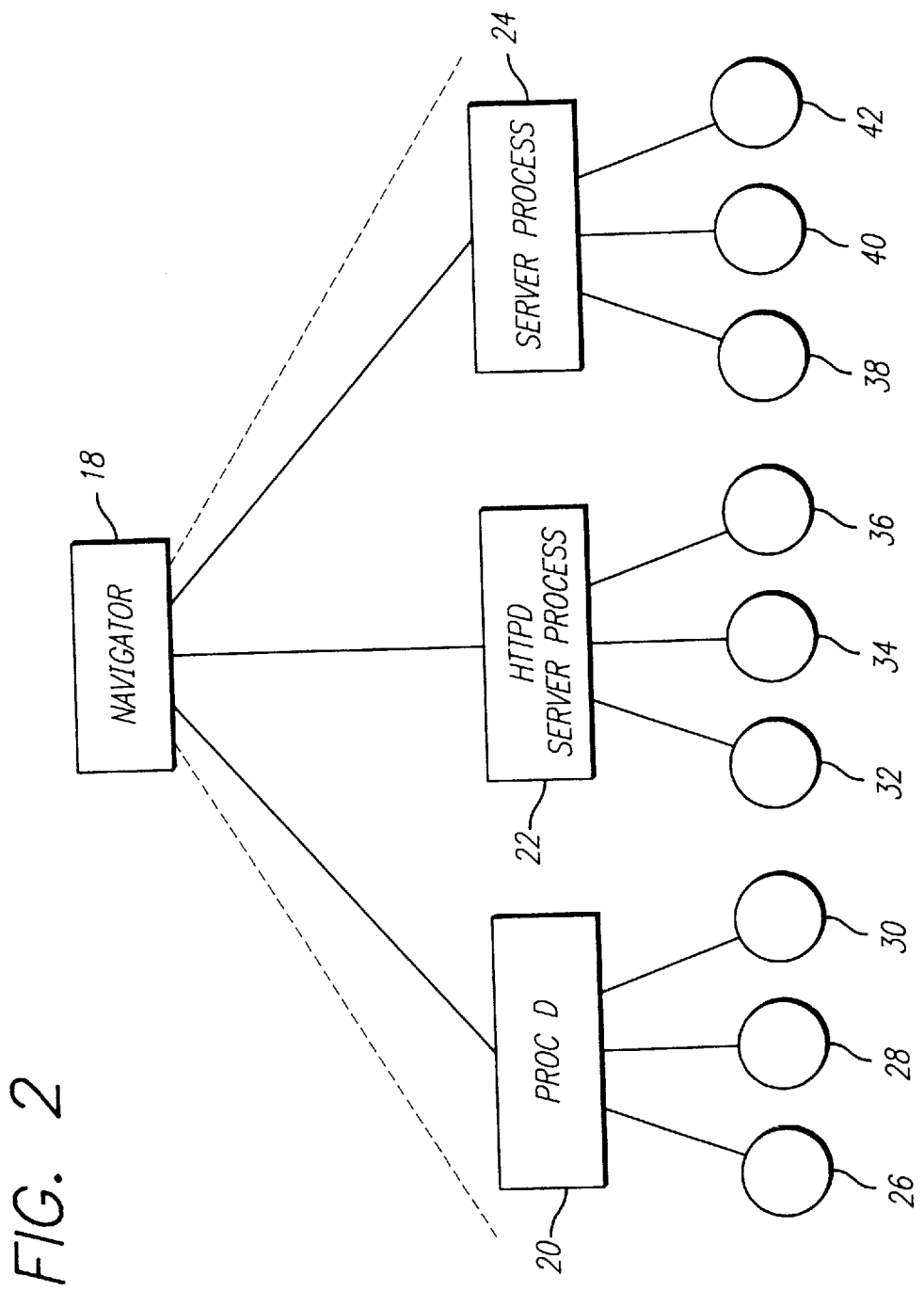
FIG. 2 is an overview of the architecture of the present invention.

FIG. 2 is an overview of the architecture of the present invention. The architecture comprises a front end navigating tool 18 that communicates with a plurality of server processes 20, 22 and 24 to perform different functions such as debugging and editing. The server processes 20, 22 and 24 communicate with gateway processes (tools) 26, 28, 30, 32, 34, 36, 38, 40 and 42 that perform a desired function on any of a plurality of program segments that may be distributed across a plurality of computers. As will be described more fully below, the navigating tool 18 comprises a browser, editor and interactive shell and allows users to perform a variety of functions on distributed program segments. For example, the server process 22 may comprise a document server that communicates with http, file and ftp gateway processes 32, 34 and 36 to perform browsing functions. Similarly, the server process 20 may comprise a process server that communicates with dbx, PC-debug and gdb gateway processes 26, 28 and 30 to perform debugging functions. It will be appreciated that the architecture illustrated in FIG. 2 may be easily extended to include many other server processes and gateway processes as indicated by the dashed lines. It will also be appreciated that two navigators may simultaneously access the same server process, gateway tool and file and that two navigators may communicate with each other in a networked environment.

As will be described more fully below, each of the server processes 20, 22 and 24 illustrated in FIG. 2 may reside on a plurality of physical machines. The architecture of the present invention provides for the integration of a variety of tools, including debugging, document and source code browsing and editing, source code management and program development and building. The implementation of these tools according to the architecture of the present invention will be described in the following sections of this Specification. It will be appreciated that the architecture of the present invention as illustrated in FIG. 2 may be applied to many other types of tools, including user defined tools.

Debugging

Figure 3:
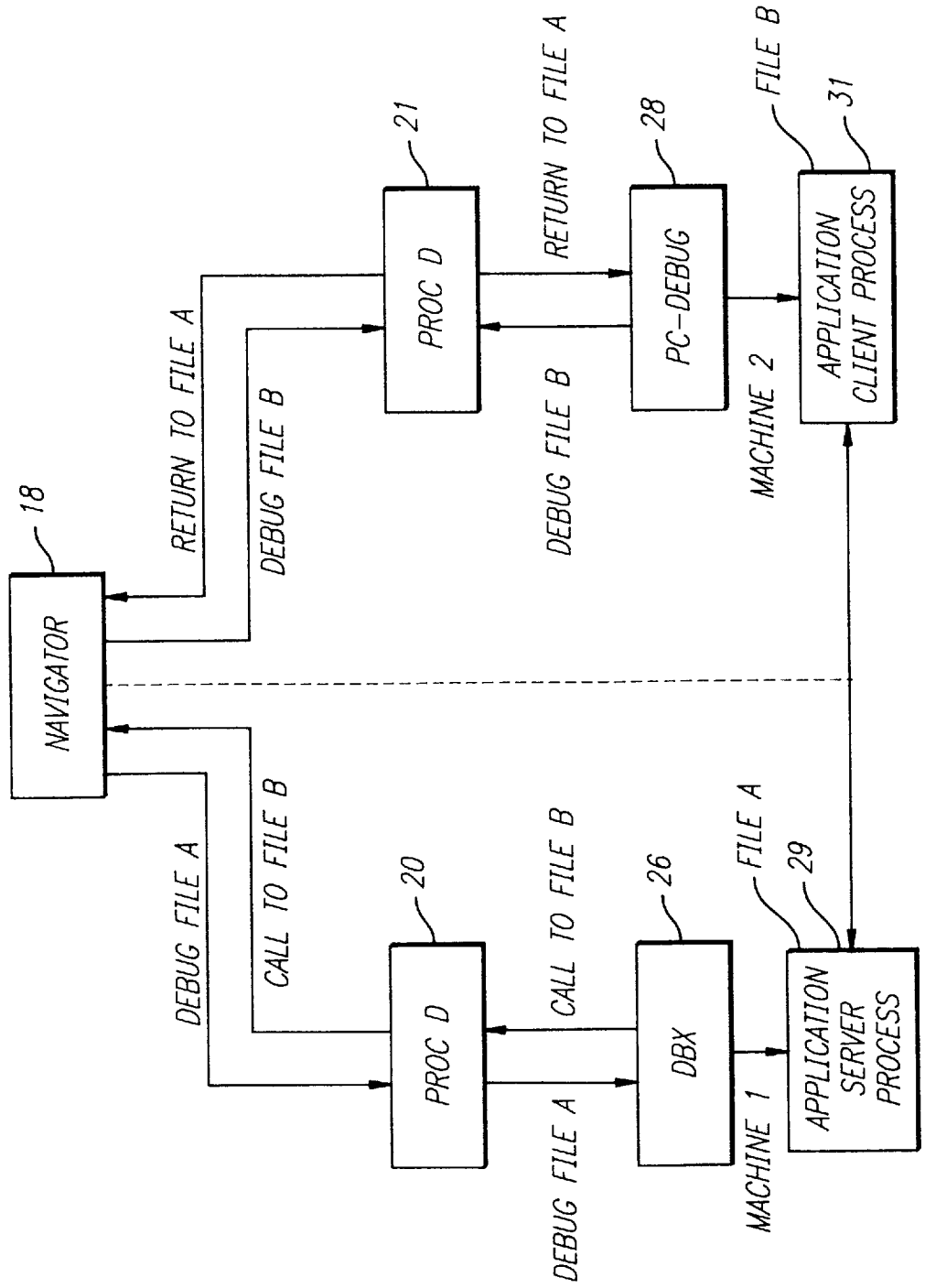
FIG. 3 is a block diagram showing how the architecture of the present invention communicates to service a debugging request.

FIG. 3 is a block diagram showing a preferred embodiment for servicing a debugging request according to the architecture of the present invention. First, the navigator 18 issues a request according to the Universal Resource Locator (URL) protocol. Thus, a request is of the form: server type://machine/request, where server type is a protocol such as, for example, http or process, machine is the actual server address and request is the program or file that is requested. The appropriate server process 20 resident on a first machine is then contacted by the navigator 18 and provided with the name of the file, file A. The server process 20 in turn selects the appropriate gateway tool 26 to perform the desired function.

The gateway tool 26 attaches to the target program 29, which is subsequently debugged. If the target program calls a program 31 on a different machine, the present invention provides a variety of mechanisms, transparent to the user, for allowing debugging to continue on the called program. In a preferred embodiment, the gateway tool 26 provides the server process 20 with the address of the called program, file B. The server process 20 notifies the navigator 18 which then automatically assembles a URL request to a server process 21 on the different host. The request is sent and the server process 21 selects the appropriate gateway process 28 which then attaches to the target program, file B 31. If file B returns to file A, then control is again passed to the navigator which calls file A as before except that the gateway process 26 has maintained the appropriate address of the instruction after the call instruction to file B. Debugging then continues on file A. In this manner, programs that are debugged by two different tools, for example dbx and PC-debug, may be debugged through a single front end navigator 18. File A 29 and File B 31 may also directly communicate with each other.

File Browsing and Editing

Figure 4:
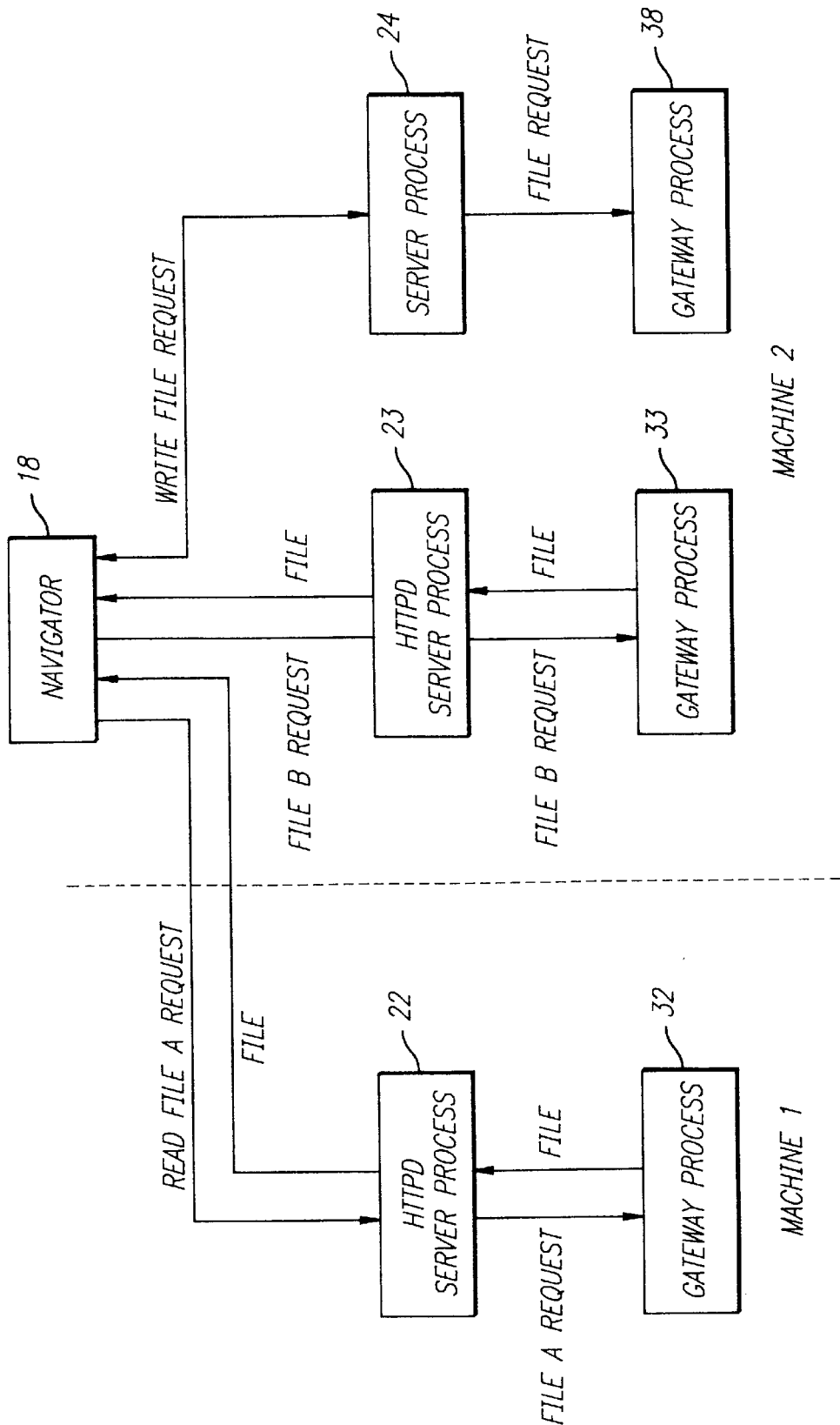
FIG. 4 illustrates one possible block diagram for browsing and editing files, which may comprise source code or any other type of document.

FIG. 4 illustrates one possible block diagram for browsing and editing files, which may comprise source code or any other type of document. It will be appreciated that a user may browse and edit documents in an infinite number of ways and FIG. 4 illustrates one possible browsing and editing session to illustrate the operation of a preferred embodiment of the present invention. To read a file, file A, the navigator 18 issues a request according to the URL protocol, as previously described. The httpd server process 22 on the appropriate machine is provided with the request and the appropriate gateway tool 32 is contacted to retrieve the file. The file, file A, is then provided to the navigator for viewing.

File A may contain hypertext links to a different file, file B. To view file B, the navigator issues a request according to the URL protocol, and file B is provided to the navigator 18 through server process 23 and gateway process 33 according to the previously described methodology. Unlike World Wide Web browsing tools, the present invention provides the ability to edit files and replace an old file with an edited file. Thus, the navigator 18 allows the user to edit the file and the navigator 18 then formulates the appropriate URL, indicating the file, file B, when the user desires to save the edited file. The appropriate server process 24 and gateway process 38 are contacted and the edited file is stored.

To browse files that include selected search terms, a request with the search terms is provided to a plurality of server processes that may be resident on different machines. Each server process contacts an appropriate gateway process to perform the search and all of the file names that contain the search terms are provided to the navigator 18.

In addition to editing and saving files and browsing files with selected search terms, the present invention provides for functionality that does not presently exist on the World Wide Web. Apart from simply browsing the contents of a file, the present invention dynamically generates information concerning the content of retrieved files. For example, a user may desire to analyze a program according to its data structures, function calls and other characteristics. To perform such an operation on a file, the navigator 18 issues a request according to the URL protocol, as previously described. An appropriate server process on the target machine is provided with the request and an an appropriate gateway tool analyzes the file and provides the results of the analysis to the navigator 18. It will be appreciated that virtually any prior art tool may be easily adapted to the architecture illustrated in FIG. 2.

User Interface

To illustrate the operation of the present invention from a user's point of view, this Section of the Specification describes an exemplary graphical user interface (GUI) for the navigator 18. It will be appreciated that many other types of GUI's may implement the present invention.

Figure 5:
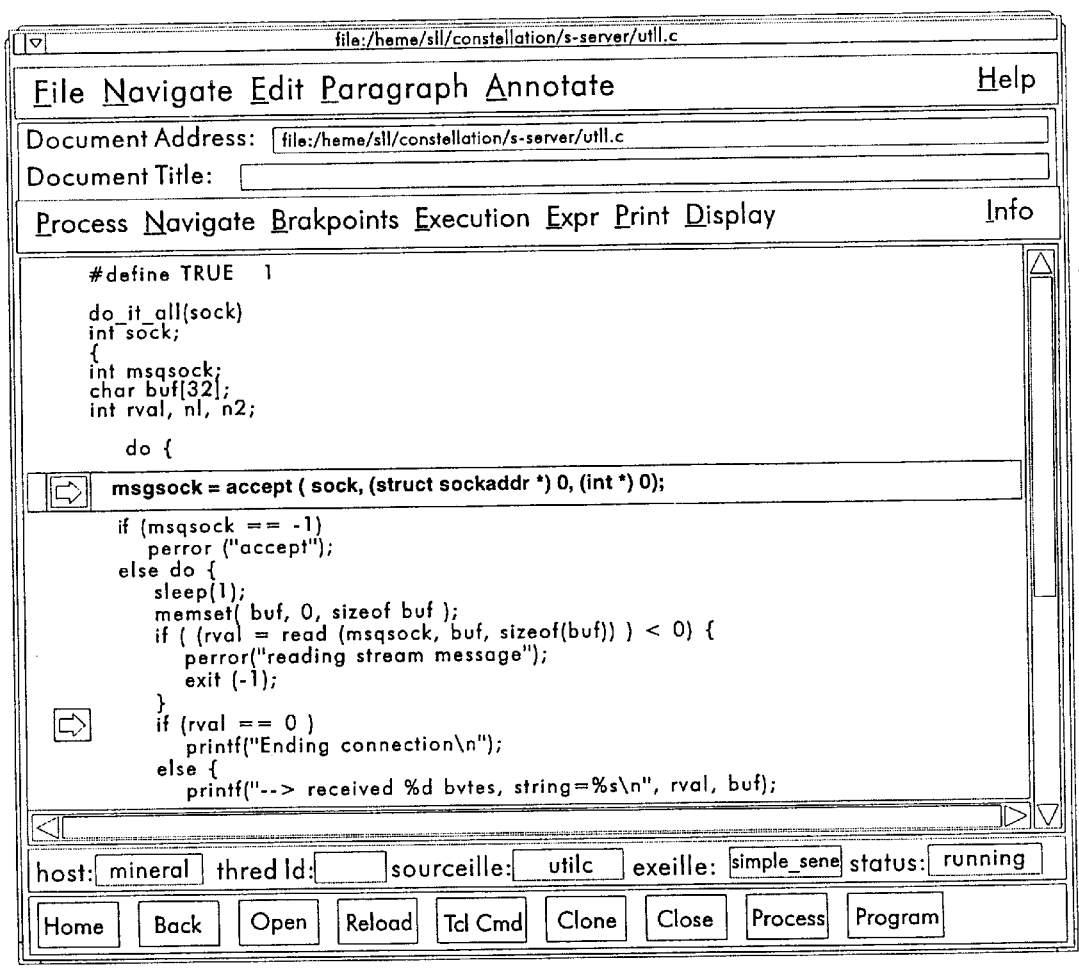
FIG. 5 is a snapshot of a screen that displays source code of a file that is being debugged.

As previously described, debugging is one example of the present invention's ability to perform a function on distributed files from a single front end navigator. FIG. 5 is a snapshot of a screen that displays source code of a file that is being debugged. The program illustrated in FIG. 5 calls a program that resides on a different machine and was written in a different language. Using the same debugging GUI as illustrated in FIG. 5, the user may place a break point at a desired line of code in the called program. After the user begins to debug the program illustrated in FIG. 5, the called program is run and processing halts at the breakpoint placed in the code of the called program, which is displayed by the navigator 18. When control passes back to the program illustrated in FIG. 5, the source code of FIG. 5 is once again displayed by the navigator. As will be appreciated, the architecture of the present invention supports any number of nested program calls. Thus, the present invention allows a user to debug distributed programs through a single GUI.

Figure 6:
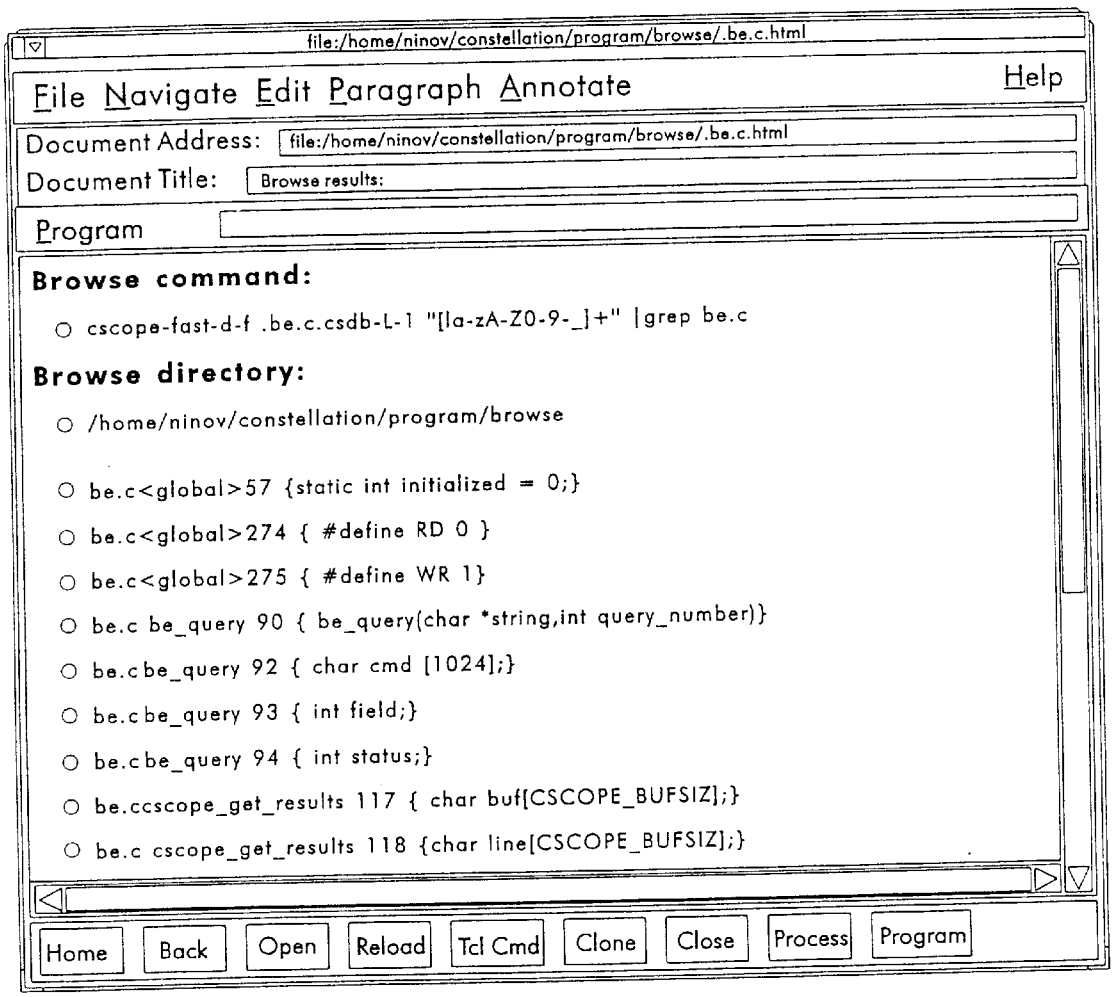
FIG. 6 is a snapshot of a screen that resulted from a browse command illustrated in the snapshot.
Figure 7:
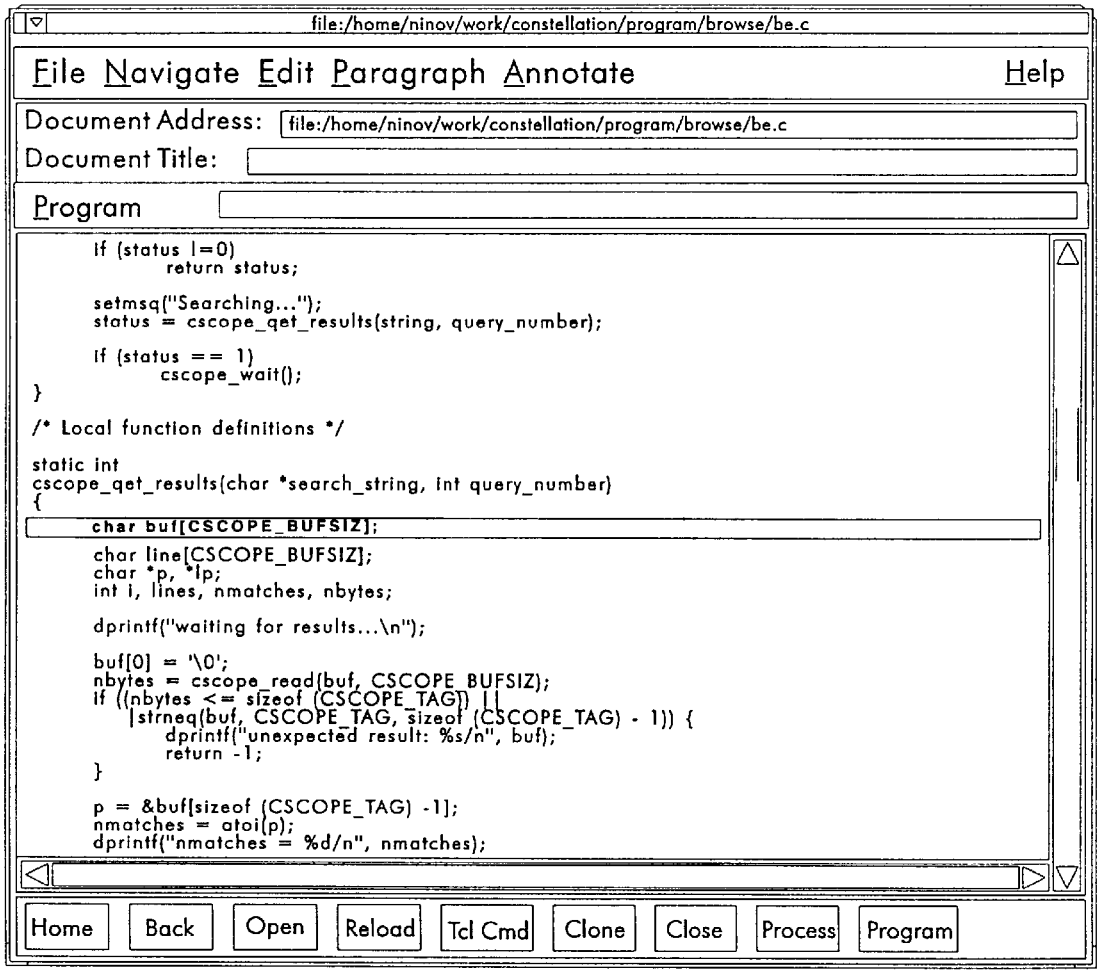
FIG. 7 is a snapshot of a screen that results from clicking on a particular file name illustrated in FIG. 6.

As previously described, the architecture of the present invention supports any type of file manipulation or service, including browsing and editing, across different physical machines and platforms. FIG. 6 is a snapshot of a screen that resulted from a browse command illustrated in the snapshot. The file names that resulted from the browse command are also shown and these files may reside on different machines but the user may easily access any of the files by clicking on the file name. FIG. 7 is a snapshot of a screen that results from clicking on a particular file name illustrated in FIG. 6. As shown in FIG. 7, the GUI provides the full panoply of functions that may be performed on the file. For example, the user may edit the file and store the edited file in place of the original file. The user may also return to the screen illustrated in FIG. 6 or jump to a hypertext link, if any exist, in the file illustrated in FIG. 6. Each time a particular file is retrieved, the user may edit the file and perform any other type of file manipulation.

Although the present invention has been described in terms of a preferred embodiment and with reference to FIGS. 1–7, it will be appreciated that various modifications and alterations might be made by those skilled in the art without departing from the spirit and scope of the invention. For example, the present invention supports any type of function, including user defined functions, that may be applied to files. The invention should therefore be measured in terms of the claims which follow.

I claim:

1. A method for performing a function on target files in a network, said network comprising a plurality of computers, said method comprising the steps of;

providing an element for performing the step of forming by a front end navigating tool a first universal resource locator (URL) for a first target file, said first target file resident on a first computer;

providing an element for performing the step of accessing a first server process indicated by said first URL and providing said first server process with a first file name for said first target file;

providing an element for performing the step of contacting by said first server process a first tool for performing a first function and providing said first tool with said first file name;

providing an element for performing the step of performing said first function by said first tool on said first target file;

providing an element for performing the step of providing by said first tool to said first server process, without user interaction, a second file name for a second target file residing on a second computer, when said first target file calls said second target file;

providing an element for performing the step of providing by said first server process to said front end navigating tool, without user interaction, said second target file name when said first target file calls said second target file;

wherein said step of forming by said front end navigating tool a second universal resource locator (URL) for a second target file comprises forming said second URL based upon said second file name provided by said first server process;

providing an element for performing the step of accessing a second server process indicated by said second URL and providing said second server process with said second file name;

providing an element for performing the step of contacting by said second server process a second tool for performing a second function and providing said second tool with said second file name;

providing an element for performing the step of performing said second function by said second tool on said second target file; and providing an element for performing the step of returning, without user interaction, to said first target file after said second function on said second target file is completed.

2. The method of claim 1 wherein said first and second server processes comprise the same type of server processes.

3. The method of claim 2 wherein said first and second server processes comprise process servers.

4. The method of claim 3 wherein said first and second tools comprise debugging tools.

5. The method of claim 4 wherein said first debugging tool operates on programs written in a different language than programs that may be operated on by said second debugging tool.

6. The method of claim 5 wherein said first server process comprises an httpd server.

7. The method of claim 6 wherein said first target file includes a hypertext link to said second target file.

8. The method of claim 7 further comprising the step of providing an editor for said first and second target files.

9. An apparatus for performing a function on target files in a network, said network comprising a plurality of computers, said apparatus comprising:

a front end navigating tool configured to form a first universal resource locator (URL) for a first target file, said first target file resident on a first computer;

a first interface device configured to access a first server process indicated by said first URL and providing said first server process with a first file name for said first target file;

a first communication device configured to contact by said first server process a first tool configured to perform a first function and providing said first tool with said first file name;

first logic configured to perform said first function by said first tool on said first target file;

wherein said first communication device further includes a device configured to provide by said first tool to said first server process, without user interaction, a second file name for a second target file residing on a second computer, when said first target file calls said second target file;

wherein said first interface device further includes a device configured to provide by said first server process to said front end navigating tool, without user interaction, said second file name when said first target file calls said second target file;

wherein said front end navigating tool forms a second URL for said second target file based upon said second file name provided by said first server process;

wherein said apparatus further comprises a second interface device configured to access a second server process indicated by said second URL and providing said second server process with said second file name;

wherein said apparatus further comprises a second communication device configured to contact by said second server process a second tool configured to perform a second function and providing said second tool with said second file name;

wherein said apparatus further comprises second logic configured to perform said second function by said second tool on said second target file; and wherein said front end navigating tool further includes a device configured to return said first target file to said front end navigating tool, without user interaction, when said second function on said second target file is completed.

10. The apparatus of claim 9 wherein said first and second server processes comprise the same type of server processes.

11. The apparatus of claim 10 wherein said first and second server processes comprise process servers.

12. The apparatus of claim 11 wherein said first and second tools comprise debugging tools.

13. The apparatus of claim 12 wherein said first debugging tool operates on programs written in a different language than programs that may be operated on by said second debugging tool.

14. The apparatus of claim 13 wherein said first server process comprises an httpd server.

15. The apparatus of claim 14 wherein said first target file includes a hypertext link to said second target file.

16. The apparatus of claim 15 wherein said front end navigating tool further comprises an editor configured to edit said first and second target files.

17. A computer program product comprising:

a computer usable medium having computer readable code embodied therein for performing a function on target files in a network, said network comprising a plurality of computers, the computer readable code comprising:

a first program module configured to effect forming by a front end navigating tool a universal resource locator (URL) for a first target file, said first target file resident on a first computer;

a second program module configured to effect accessing a first server process indicated by said first URL and providing said first server process with a file name for said first target file;

a third program module configured to effect contacting by said first server process a first tool for performing a first function and providing said first tool with said first file name;

a fourth program module configured to effect performing said first function by said first tool on said first target file;

a fifth program module configured to effect providing by said first tool to said first server process a second file name for a second target file residing on a second computer, when said first target file calls said second target file;

a sixth program module configured to effect providing by said first server process to said front end navigating tool said second file name when said first target file calls said second target file;

a seventh program module configured to effect forming a universal resource locator (URL) by said front end navigating tool for said second target file based upon said second file name provided by said first server process;

an eighth program module configured to effect contacting by a second server process a second tool for performing a second function and providing said second tool with said second file name;

a ninth program module configured to effect performing said second function by said second tool on said second target file; and a tenth program module configured to effect the return of said first target file to said front end navigating tool when said second function on said second target file is completed.

* * * * *